Oct. 7, 1924.
R. McINTYRE
1,511,086
SAFETY GUARD FOR THE FRONTS OF VEHICLES
Filed June 19, 1924
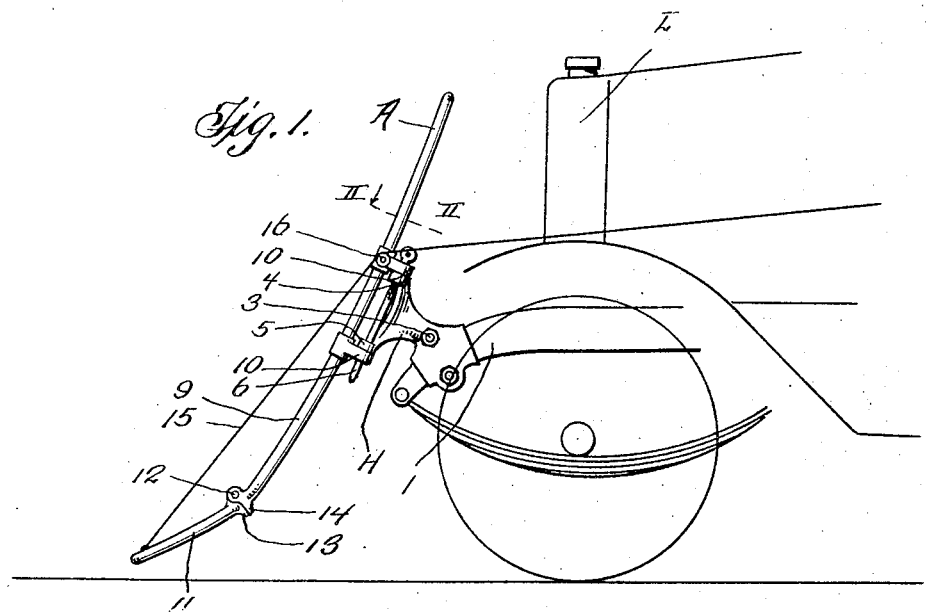
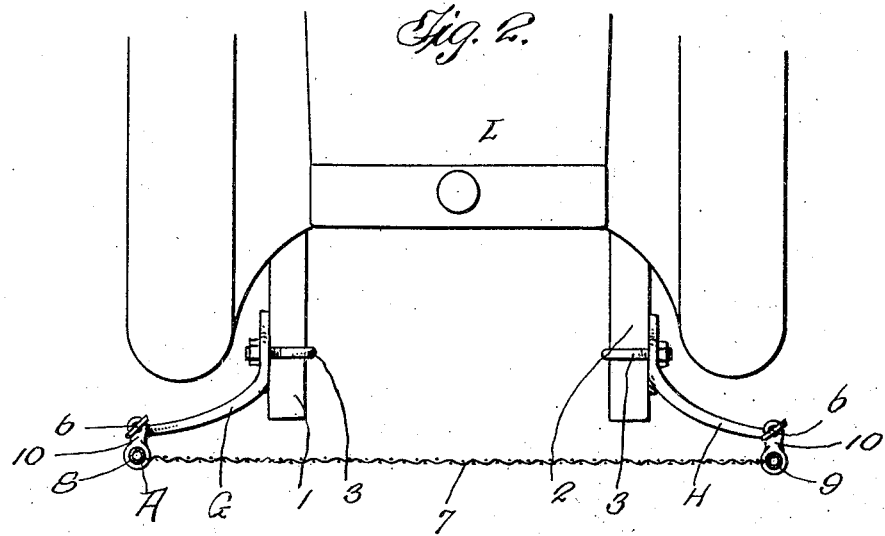
INVENTOR
Robert McIntyre
BY
ATTORNEY

Patented Oct. 7, 1924.

1,511,086

UNITED STATES PATENT OFFICE.

ROBERT McINTYRE, OF NORTH BERGEN, NEW JERSEY.

SAFETY GUARD FOR THE FRONTS OF VEHICLES.

Application filed June 19, 1924. Serial No. 720,888.

*To all whom it may concern:*

Be it known that I, ROBERT MCINTYRE, a citizen of the United States, and resident of North Bergen, in the county of Bergen and State of New Jersey, have invented certain new and useful Improvements in Safety Guards for the Fronts of Vehicles, of which the following is a specification.

This invention relates to a safety guard for the fronts of vehicles.

An object of the invention is to provide a guard device which will be of simple strong and substantial construction and serviceable to prevent serious injury to any person who may be struck by the vehicle.

A further object is to so mount the guard device in front of the vehicle that it may be readily swung to either side of the vehicle to facilitate the making of repairs, etc.

A further object is to provide the guard device with means whereby the vehicle driver may easily and conveniently cause the lower edge portion of the guard device to be lifted at will for passing over road obstructions, etc.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claims.

In the accompanying drawings which are to be taken as a part of this specification and in which I have shown merely a preferred form of embodiment of the invention:—

Fig. 1 is a side elevational view of a guard device constructed in accordance with this invention and showing same in position in front of a vehicle.

Fig. 2 is a top plan view of the parts seen in Fig. 1, the guard device being shown in horizontal section on the plane of line II—II of Fig. 1.

Referring to the drawings for describing in detail the structure therein illustrated, the reference character "L" indicates the vehicle, in this instance being shown as the forward portion of an automobile or the like and as including a pair of forwardly projecting arms or supporting members 1 and 2. The supporting members 1 and 2 may be projecting portions of the vehicle side frames or they may be members fixed to the vehicle axle, or otherwise as may be desired, their purpose in the present invention being to serve as a supporting foundation to which the guard device of this invention is attached.

A bracket "G" is connected to one of the supports as 1 and a similar bracket "H" is connected to the other support as 2, the means of connection between said brackets and their supports being of any suitable type and being shown herein for the purpose of illustration only as clamp bolts 3.

The brackets "G" and "H" extend forwardly of the supports and laterally away from each other and at their outer ends provide each a pair of bearings 4 and 5 adapted to receive a pivot rod 6 by which the guard device proper is connected with the brackets.

The guard device proper includes a rectangular frame as "A" made of any suitable material, either hollow tubing as indicated or flat bar steel, or otherwise. The material from which it is formed, however, is preferably suitably resilient or flexible, so as to enable it to yield whenever it is struck a blow as for instance, when it comes into contact with a person or other obstacle in the path of the vehicle, and in this connection it is to be noted that brackets "G" and "H" are preferably also of resilient material so as to enable them to yield to a desirable extent whenever the guard device encounters an obstacle.

The frame "A" supports a screen or net portion 7 which is of such resilient material as to form a proper buffer to engage against a person struck.

The side bars as 8 and 9 of the frame have each a pair of bearings 10 thereon arranged to mate with the bearings 4 and 5 of the brackets "G" and "H."

The pivot rods 6 pass through the bearings 10 and thus connect the frame "A" with the brackets "G" and "H." They are sufficiently loose so that they may be readily removed whenever desired, and since these supporting elements at opposite sides of the frame are identical it follows that by removal of either of the pivot rods the other pivot rod will serve as a pivot upon which the frame "A" may be swung away from its position in front of the vehicle to thus facilitate the making of repairs either to the vehicle or to the guard device. Likewise, removal of both of the pivot rods will entirely release the frame from the brackets "G" and "H."

The frame "A" is preferably disposed at an incline so that its lower horizontal edge projects farther forward than its upper edge, and the bearings 4 and 5 are positioned accordingly as will be seen from the illustration Fig. 1. By this arrangement not only is the guard device placed in a desirable effective inclined position, but also the frame "A" will be held by gravity against return movement whenever it has been swung away from the front of the vehicle.

In order that the lower edge of the guard device may be positioned as close to the road surface as possible, and yet not be liable to injury by striking obstructions on the roadway, the frame "A" is provided with a hinged extension 11 extending across its lower horizontal edge, said extension being pivotally connected to frame "A" as by means of pivot 12 and being held by gravity in a proper inclined position by engagement of a pair of stops 13 and 14 adjacent said pivot.

Any suitable means may be provided for swinging extension 11 upwardly about the pivot 12 to avoid a road obstruction and for this purpose the drawing herewith suggests the use of a cable 15 attached to the free end of the extension and extending upwardly over a pulley 16 provided upon one of the bearing numbers 10 the cable continuing thence to a position of accessibility adjacent the driver's seat.

A vehicle equipped with a guard device as suggested herein will not be likely to cause any serious injury to a pedestrian or other person obstructing the path of the vehicle. The guard device protects the entire front of vehicle. Its manner of attachment is simple and efficient and of such arrangement as to permit of quick and easy removal of the guard device from its operative position either wholly or upon a hinge connection.

As many changes could be made in this construction without departing from the scope of the invention as defined in the following claims, it is intended that all matter contained in the above description or shown in the accompanying drawings, shall be interpreted as illustrative only and not in a limiting sense.

Having thus described the invention, what I claim is new and desire to secure by Letters Patent is:—

1. A safety guard for the front of vehicles, comprising a guard member in the shape of a rectangular frame having a resilient buffer thereon, said frame being also resilient and being adapted to stand in position in front of the vehicle, and brackets for connecting said frame with the vehicle said brackets being also resilient, all for the purposes set forth.

2. A safety guard for the front of vehicles, comprising a rectangular frame and a buffer thereon, said frame being adapted to stand in position extending across the front of the vehicle, supporting means for connecting the frame with the vehicle including separable pivot elements by which the frame may be swung to either side of the vehicle or wholly detached from the vehicle at will, and said pivot elements being disposed so that the pivotal axes thereof are inclined from the vertical for the purpose set forth.

3. A safety guard for the front of vehicles, comprising a rectangular frame and a buffer thereon, said frame being adapted to stand in position extending across the front of the vehicle, supporting means for connecting the frame with the vehicle including separable pivot elements by which the frame may be swung at will to one side of the vehicle, and said pivot elements being disposed so that the pivotal axis thereof is inclined from the vertical for the purpose set forth.

In testimony whereof I affix my signature in the presence of two witnesses.

ROBERT McINTYRE.

Witnesses:
L. GESSFORD HANDY,
GEORGE B. McINTYRE.